(12) United States Patent
Katagiri

(10) Patent No.: US 6,490,415 B2
(45) Date of Patent: Dec. 3, 2002

(54) CAMERA EQUIPPED WITH FLASH LIGHT EMISSION UNIT

(75) Inventor: Moriya Katagiri, Tokyo (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/947,242

(22) Filed: Sep. 5, 2001

(65) Prior Publication Data

US 2002/0028073 A1 Mar. 7, 2002

(30) Foreign Application Priority Data

Sep. 6, 2000 (JP) ........................ 2000-270325

(51) Int. Cl.⁷ .............................................. G03B 15/03
(52) U.S. Cl. ...................................................... 396/177
(58) Field of Search ................................. 396/176, 177, 396/178

(56) References Cited

U.S. PATENT DOCUMENTS

| | | | | |
|---|---|---|---|---|
| 4,855,771 A | * | 8/1989 | Alligood et al. | ............ 396/178 |
| 5,179,401 A | * | 1/1993 | Reddig | ............ 396/178 |
| 5,708,875 A | * | 1/1998 | Hayakawa | ............ 396/176 |
| 5,926,658 A | * | 7/1999 | Tenmyo | ............ 396/177 |
| 5,987,263 A | * | 11/1999 | Toyoda et al. | ............ 396/178 |
| 6,041,185 A | * | 3/2000 | Suzuki | ............ 396/177 X |

FOREIGN PATENT DOCUMENTS

| | | | | |
|---|---|---|---|---|
| JP | 7-64142 | 3/1995 | ............ G03B/5/00 |
| JP | 7-199295 | 8/1995 | ............ G03B/15/05 |
| JP | 8-286242 | 11/1996 | ............ G03B/15/05 |

* cited by examiner

Primary Examiner—W. B. Perkey
(74) Attorney, Agent, or Firm—Ostrolenk, Faber, Gerb & Soffen, LLP

(57) ABSTRACT

A camera comprises a flash light emission section displaceable between a protruding position in which it protrudes from a camera main body, and a storage position in which it is stored in the camera main body. A pivot is provided nonparallel to a direction of light emitted from the flash light emission section, and also nonparallel to a plane perpendicular to the direction of light emitted from the flash light emission section. The pivot supports the flash light emission section such that the flash light emission section can pivot between the protruding position and the storage position.

15 Claims, 4 Drawing Sheets

CAMERA EQUIPPED WITH FLASH LIGHT EMISSION UNIT

CROSS-REFERENCE TO RELATED APPLICATIONS

This application is based upon and claims the benefit of priority from the prior Japanese Patent Application No. 2000-270325, filed Sep. 6, 2000, the entire contents of which are incorporated herein by reference.

BACKGROUND OF THE INVENTION

1. Field of the Invention

The present invention relates to a camera equipped with a flash light emission unit.

2. Description of the Related Art

Cameras equipped with flash light emission units are well known. Jpn. Pat. Appln. KOKAI Publication No. 7-199295, for example, discloses a camera provided with a rectangular flash light emission unit. When emitting flash light, this flash light emission unit pops up about a pivot provided perpendicular to the direction of flash emission.

In the camera disclosed in the publication, the flash light emission unit that looks rectangular-shaped when viewed from the front side of the camera pops up, and hence does not look good.

To improve the frontal appearance, the camera disclosed in Jpn. Pat. Appln. KOKAI Publication No. 7-64142 incorporates a flash light emission unit constructed to pop up obliquely, when viewed from the front side of the camera, about a pivot provided parallel to the direction of flash emission. This structure, however, requires extra lateral space.

Jpn. Pat. Appln. KOKAI Publication No. 8-286242 discloses a camera having a flash light emission unit that pops up obliquely and does not require extra lateral space. Since, however, this camera employs a link mechanism for popping up the flash unit, its structure is inevitably complicated.

As stated above, the conventional cameras have their respective problems of bad frontal appearance, large lateral space requirement, or a complicated pop-up mechanism.

BRIEF SUMMARY OF THE INVENTION

In light of the above, it is the object of the present invention to provide a camera equipped with a flash light emission unit that has a good frontal. appearance, requires no large lateral space, and employs a simple mechanism.

To attain the object, according to a first aspect of the invention, there is provided a camera comprising:
 a flash light emission section displaceable between a protruding position in which it protrudes from a camera main body, and a storage position in which it is stored in the camera main body; and
 a pivot provided nonparallel to a direction of light emitted from the flash light emission section, and also nonparallel to a plane perpendicular to the direction of light emitted from the flash light emission section, the pivot supporting the flash light emission section such that the flash light emission section can pivot between the protruding position and the storage position.

According to a second aspect of the invention, there is provided a camera comprising:
 a photographic lens;
 a flash light emission section displaceable between a protruding position in which it protrudes from a camera main body, and a storage position in which it is stored in the camera main body, the flash light emission section emitting flash light to a photographic subject in front of the camera along an optical axis of the photographic lens; and
 a pivot provided nonparallel to the optical axis of the photographic lens, and intersecting a plane perpendicular to the optical axis of the photographic lens, the pivot supporting the flash light emission section such that the flash light emission section can pivot between the protruding position and the storage position.

According to a third aspect of the invention, there is provided a camera comprising:
 a photographic lens;
 a flash light emission section displaceable between a protruding position in which it protrudes from a camera main body, and a storage position in which it is stored in the camera main body, the flash light emission section emitting flash light to a photographic subject in front of the camera along an optical axis of the photographic lens, the flash light emission section including a linear light emission tube, a reflector and a flash case that contains the light emission tube and the reflector and has an opening for light emission; and
 a pivot provided nonparallel to the optical axis of the photographic lens, and also nonparallel to a plane perpendicular to the optical axis of the photographic lens when viewed from above the camera, the pivot supporting the flash light emission section such that the flash light emission section can pivot.

According to a fourth aspect of the invention, there is provided a flash light emission unit comprising:
 a flash light emission section for emitting flash light, the flash light emission section being displaceable between a first position in which light emission is permitted and a second position in which light emission is inhibited; and
 a pivot provided nonparallel to a direction of light emitted from the flash light emission section, and also nonparallel to a plane perpendicular to the direction of light emitted from the flash light emission section, the pivot supporting the flash light emission section such that the flash light emission section can pivot between the first and second positions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiment of the present invention will be described in detail with reference to the accompanying drawings.

Figure 1A:
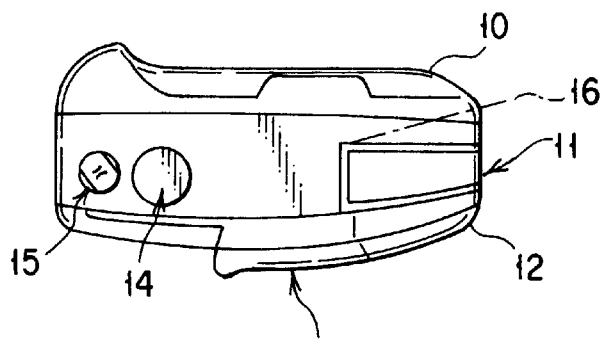
FIGS. 1A, 1B and 1C are views illustrating an external appearance of a camera having a flash light emission section.
Figure 1B:
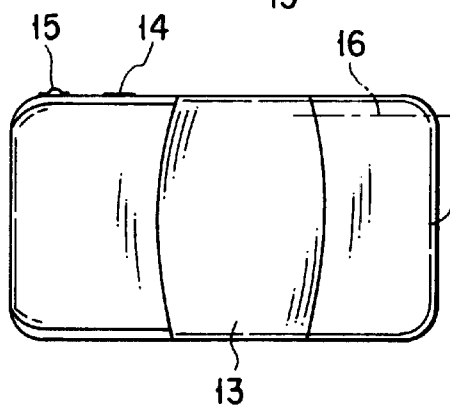
Figure 1C:
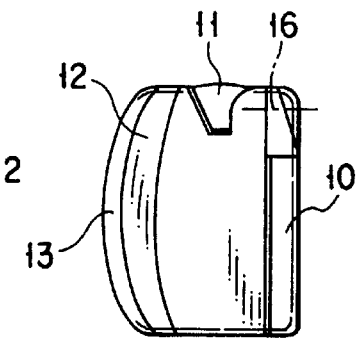

FIGS. 1A, 1B and 1C are views illustrating an external appearance of a camera having a flash light emission section that includes an emission tube, a reflector and a flash case containing them. FIG. 1A is an overhead view, FIG. 1B a front view and FIG. 1C a side view. A zoom lever 15 and a release button 14 are provided on an upper left surface portion of the camera, while a flash case 11 pivotable on a pivot 16 is provided on an upper right surface portion of the camera. Further, a front cover 12 and a barrier 13 covering a lens barrel are attached to the front surface of the camera. A rear cover 10 is attached to the rear surface of the camera. FIGS. 1A, 1B and 1C show a state in which the flash light emission section is stored in a storage position in the camera main body.

As is understood from FIGS. 1A, 1B and 1C, the pivot 16 in the embodiment is inclined by a predetermined angle with respect to a plane facing a photographic subject, and has the following positional features 1)–7):

1) The pivot 16 is nonparallel to the direction of light emitted from the flash light emission section, and also nonparallel to the plane perpendicular to the direction of the emitted light;
2) The pivot 16 is nonparallel to the optical axis of a photographic lens, and intersects the plane perpendicular to the optical axis of the photographic lens;
3) The pivot 16 is provided on the opposite side of the emission direction side with respect to the flash light emission section;
4) Where the flash light emission section is in the storage position, the pivot 16 is substantially parallel to the longitudinal direction of the flash emission tube when viewed from the front of the camera, and inclined to the longitudinal direction of the same when viewed from above the camera;
5) Where the flash light emission section is in the storage position, the pivot 16 is nonparallel to the optical axis of the photographic lens, and also to the plane perpendicular to the optical axis of the photographic lens, when viewed from above the camera;
6) Where the flash light emission section is in the storage position, the distance between the pivot 16 and a horizontal plane formed in front of the pivot 16 increases as the pivot 16 is away from a central portion of the camera main body along the horizontal plane, when viewed from above the camera; and
7) Where the flash light emission section is in the storage position, it is parallel to the pivot 16 when viewed from the front of the camera. At this time, the pivot 16 extends along the external line of the camera exterior section, which forms the front and upper surfaces of the camera. The camera exterior section will be described later with reference to FIG. 8.

Figure 2A:
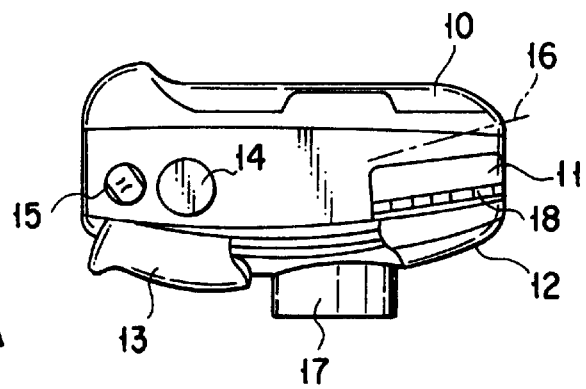
FIGS. 2A, 2B and 2C are views illustrating a state in which a flash light emission section 18 is popped-up, linked to the operation of opening a barrier 13 and protruding a lens barrel 17.
Figures 2B, 2C:
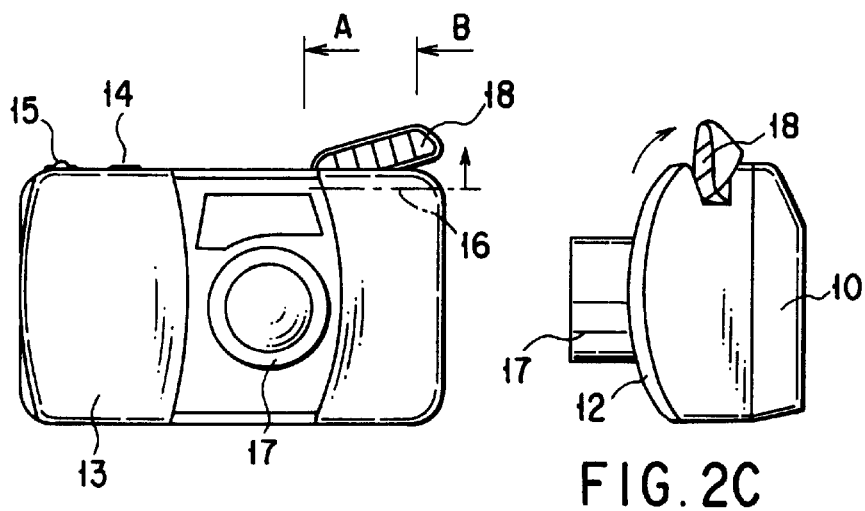

FIGS. 2A, 2B and 2C are views illustrating a state in which the barrier 13 is slid leftward and opened, and the flash light emission section 18 is made to pivot on the pivot 16 to thereby be popped-up into its protruding position, linked to the operation of protruding the lens barrel 17. The arrows (→) in FIGS. 2B and 2C respectively indicate the pop-up direction.

Figure 3A:
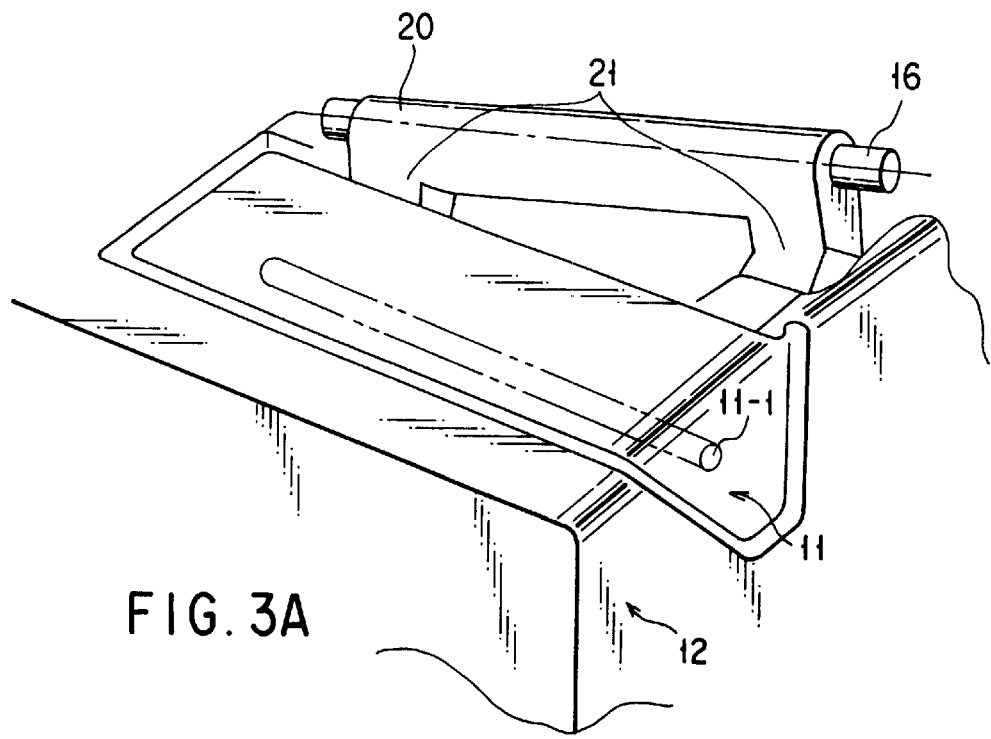
FIGS. 3A and 3B are enlarged views of peripheral elements of the flash light emission section 18.
Figure 3B:
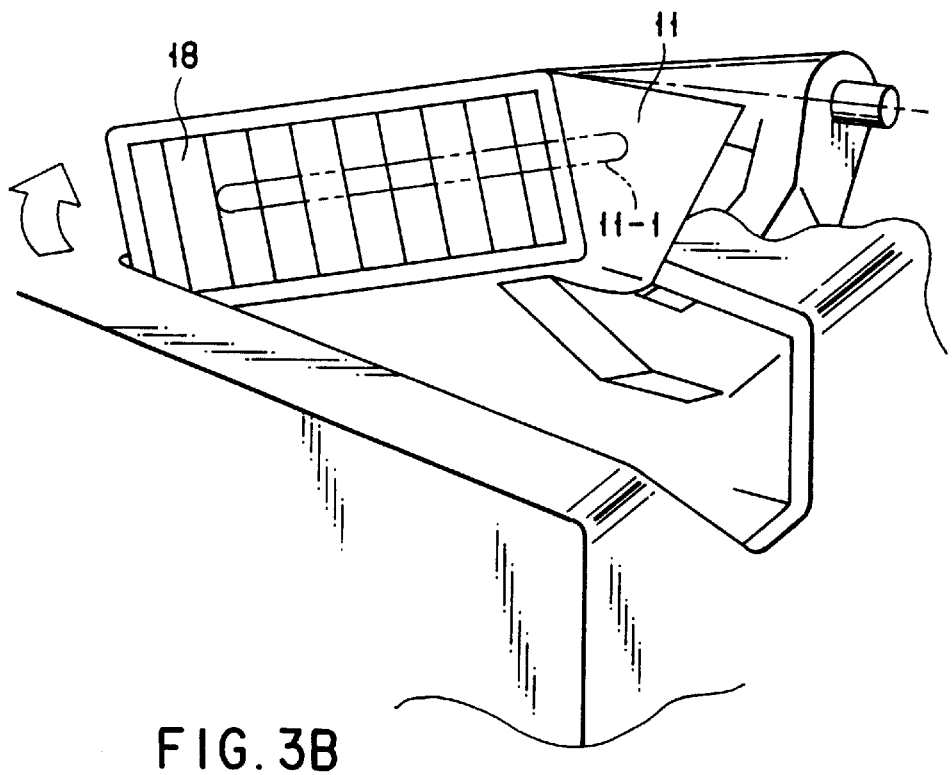

FIGS. 3A and 3B are enlarged views of peripheral elements of the flash light emission section 18 shown in FIGS. 1A, 1B, 1C, 2A, 2B and 2C. FIG. 3A illustrates a state in which the flash light emission section 18 is stored with the pivot 16 supported by a bearing 20, and with the bearing 20 connected to the flash case 11 by an arm section 21. FIG. 3B shows a state in which the flash light emission section 18 is popped-up and the opening for light emission is seen. Reference numeral 11-1 denotes a light emission tube stored in the flash case 11.

Figure 4A:
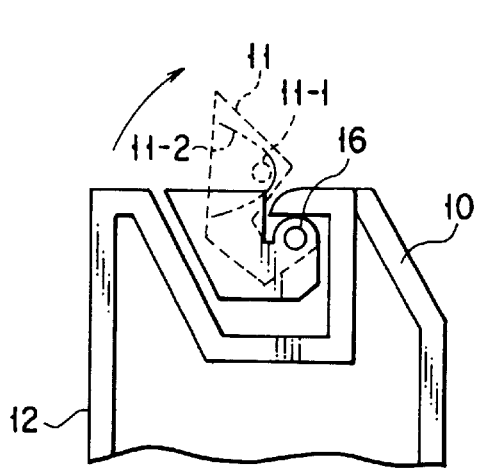
FIG. 4A is a sectional view taken along line A—A of FIG. 2B.
Figure 4B:
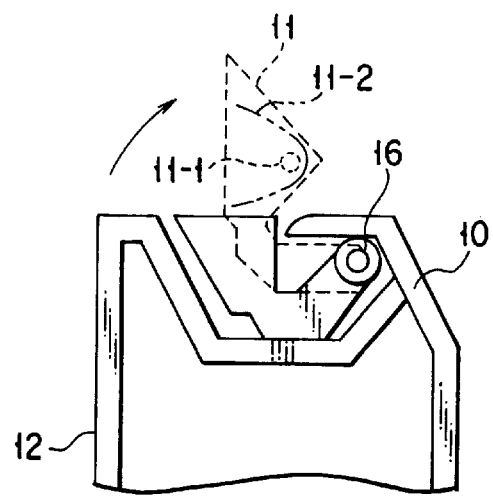
FIG. 4B is a sectional view taken along line B—B of FIG. 2B.

FIG. 4A is a sectional view taken along line A of FIG. 2B, while FIG. 4B is a sectional view taken along line B of FIG. 2B. As shown in these figures, the position of the pivot 16 differs in different sections, and the pivot 16 is inclined by a predetermined angle with respect to a plane facing a photographic subject. The flash case 11 containing the emission tube 11-1 and a reflector 11-2 pivots on the pivot 16. The tip of the flash case 11 in the section of FIG. 4B displaces by an amount greater than the tip of the flash case 11 in the section of FIG. 4A, and hence the degree of pop-up of the flash case 11 is greater in the section of FIG. 4B than in the section of FIG. 4A. In other words, the flash light emission section 18 is popped-up obliquely as a whole as shown in FIG. 2B. The arrows (→) in FIGS. 4A and 4B respectively indicate the pop-up direction.

Figure 5:
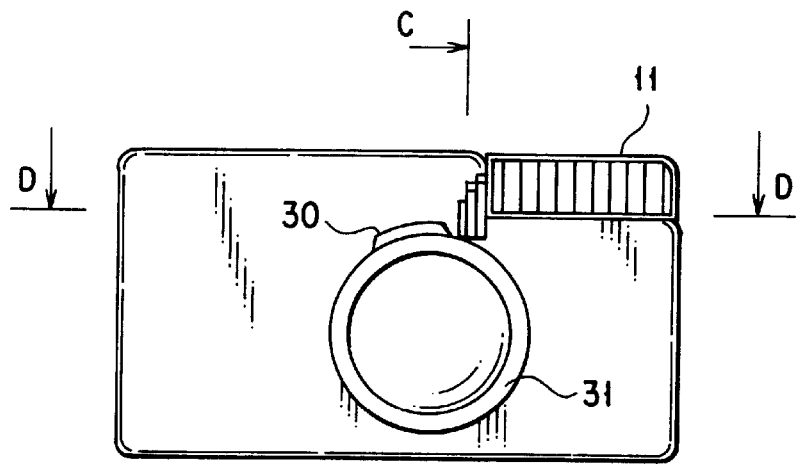
FIG. 5 is a front view of the camera, useful in explaining the principle of popping up the flash light emission section.
Figure 6:
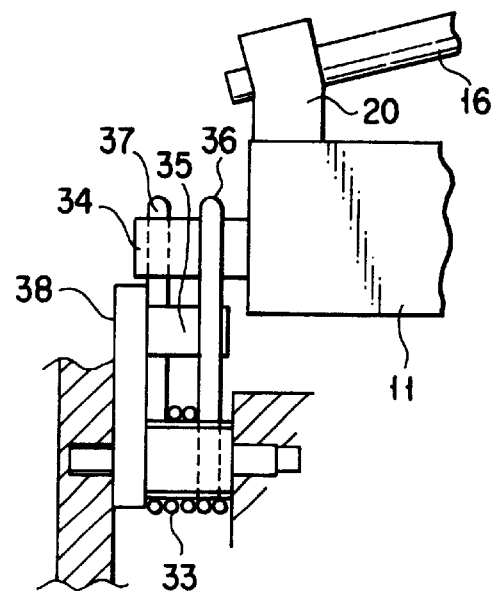
FIG. 6 is a sectional view taken along line D—D of FIG. 5.
Figure 7A:
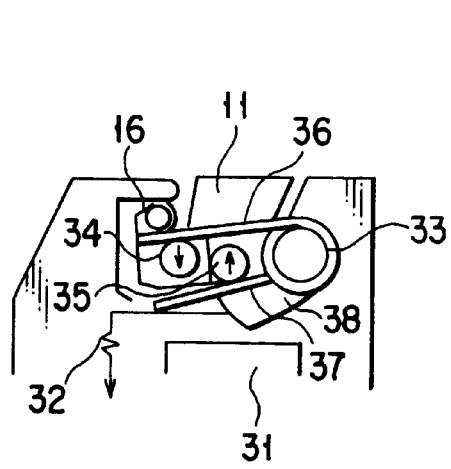
FIG. 7A is a sectional view taken line C of FIG. 5 and illustrating a state in which a flash case 11 is retracted.
Figure 7B:
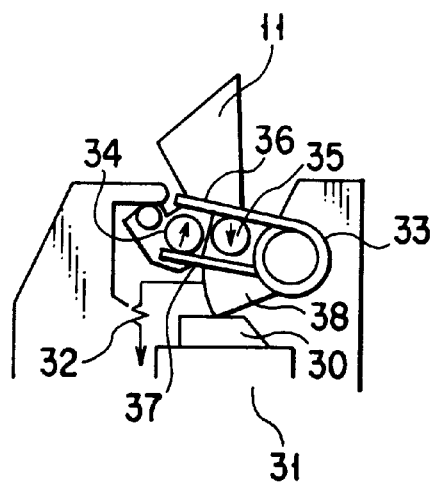
FIG. 7B is a sectional view taken line C of FIG. 5 and illustrating a state in which the flash case 11 is popped-up.

FIGS. 5, 6, 7A and 7B are views useful in explaining the principle of popping up the flash light emission section 18. FIG. 5 is a front view, and FIG. 6 a sectional view taken along line D—D of FIG. 5. FIGS. 7A and 7B are views taken along line C of FIG. 5. FIG. 7A shows a state in which the flash case 11 is stored, while FIG. 7B shows a state in which the flash case 11 is popped-up.

The bearing 20 supports the pivot 16 and is connected to the flash case 11. A boss 34 is provided on a side face of the flash case 11. A lift lever 38 is provided on the camera main body, and a boss 35 is provided on the lift lever 38. A charge spring 33 is mounted on part of the lift lever 38. Portions of the charge spring 33 form a pair of leg portions 36 and 37. The bosses 34 and 35 are located between the leg portions 36 and 37 of the charge spring 33. A lift spring 32 presses the lift lever 38 counterclockwise (downwardly). The leg portion 36 of the charge spring 33 downwardly presses the boss 34, while the leg portion 37 of the spring 33 upwardly presses the boss 35. Thus, the bosses 34 and 35 are held between the leg portions 36 and 37 of the charge spring 33, thereby maintaining the storage state of the flash case 11.

In the above-described structure, when the barrier 13 is opened as shown in FIG. 2, the lens barrel 17 forwardly protrudes, and a rotation frame 31 rotates clockwise. At this time, a pop-up cam 30 provided on a peripheral surface portion of the rotation frame 31 raises the lift lever 38 (FIG. 7B). When the lift lever 38 is raised, the boss 35 is also raised, thereby raising the leg portion 36 of the charge spring 33. Linked to this, the leg portion 37 of the charge spring 33 raises the boss 34 of the flash case 11, whereby the flash case 11 pivots on the pivot 16, i.e. is popped-up.

Figure 8:
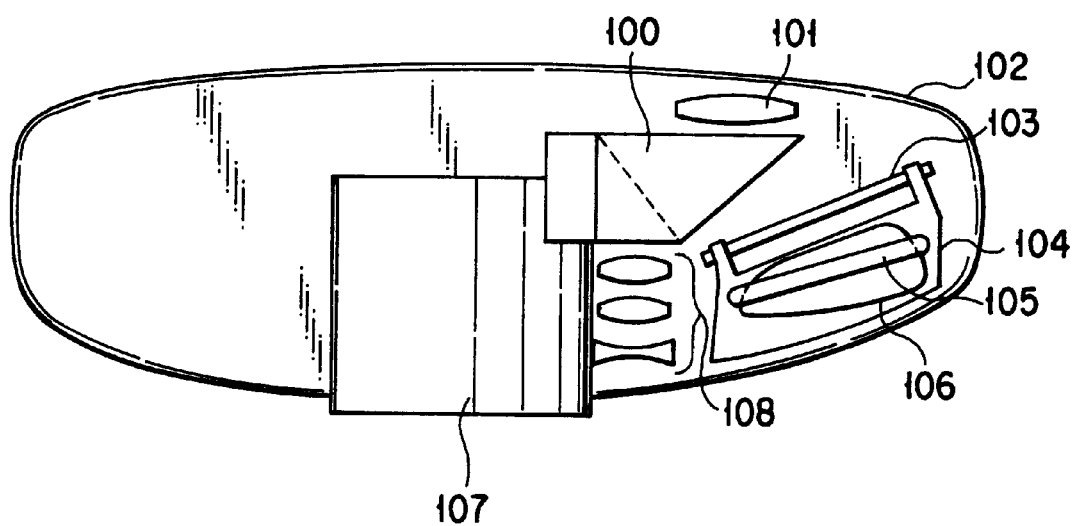
FIG. 8 is a sectional view illustrating an example structure of an upper portion of a camera to which the flash light emission section of the invention is applied.

FIG. 8 is a sectional view illustrating an example structure of an upper portion of a camera, to which the flash light emission section of the present invention is applied. In this case, suppose that a lens barrel 107, a prism 100, an eyepiece 101, and an objective 108, etc., which are elements necessary for the operation of the camera, are provided in a camera exterior 102 as shown in FIG. 8. When employing this arrangement, it is difficult in the prior art to secure a space for arranging a flash case 104 with a xenon tube 105 as a light emission tube and a reflector 106 stored therein.

However, in the flash light emission unit of the present invention, since a pivot 103 is inclined by a predetermined angle with respect to a plane facing a photographic subject, thereby popping up the flash light emission section, part of a finder can be located in an oblique space in the camera exterior 102, i.e. in a triangular space between the camera exterior 102 and the pivot 103. This means that this narrow space is effectively used, thereby increasing the degree of freedom of designing the other components of the camera.

The present invention can provide a machine, a camera and an emission unit equipped with a flash light emission section of a good frontal appearance, which requires no large lateral space and employs a simple mechanism, and also provide a camera having the emission unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a flash light emission section displaceable between a protruding position in which it protrudes from a camera main body, and a storage position in which it is stored in the camera main body; and
   a pivot provided nonparallel to a direction of light emitted from the flash light emission section, and also nonparallel to a plane perpendicular to the direction of light emitted from the flash light emission section, the pivot supporting the flash light emission section such that the flash light emission section can pivot between the protruding position and the storage position.

2. The camera according to claim 1, wherein the pivot is provided on an opposite side of an emission direction side with respect to the flash light emission section.

3. A camera comprising:
   a photographic lens;
   a flash light emission section displaceable between a protruding position in which it protrudes from a camera main body, and a storage position in which it is stored in the camera main body, the flash light emission section emitting flash light to a photographic subject in front of the camera along an optical axis of the photographic lens; and
   a pivot provided nonparallel to the optical axis of the photographic lens, and intersecting a plane perpendicular to the optical axis of the photographic lens, the pivot supporting the flash light emission section such that the flash light emission section can pivot between the protruding position and the storage position.

4. The camera according to claim 3, wherein the pivot is provided behind the flash light emission section.

5. The camera according to claim 3, wherein the flash light emission section includes a flash case, and a linear light emission tube and a reflector provided in the flash case.

6. The camera according to claim 5, wherein when the flash light emission section is in the storage position, the pivot is substantially parallel to a longitudinal direction of the light emission tube when viewed from the front of the camera, and inclined to the longitudinal direction of the light emission section when viewed from above the camera.

7. The camera according to claim 6, wherein the flash light emission section includes a light projection section, the light projection section of the flash light emission section being inclined, when viewed from the front of the camera, after the flash light emission section pivots on the pivot and shifts from the storage position to the protruding position.

8. A camera comprising:
   a photographic lens;
   a flash light emission section displaceable between a protruding position in which it protrudes from a camera main body, and a storage position in which it is stored in the camera main body, the flash light emission section emitting flash light to a photographic subject in front of the camera along an optical axis of the photographic lens, the flash light emission section including a linear light emission tube, a reflector and a flash case that contains the light emission tube and the reflector and has an opening for light emission; and
   a pivot provided nonparallel to the optical axis of the photographic lens, and also nonparallel to a plane perpendicular to the optical axis of the photographic lens when viewed from above the camera, the pivot supporting the flash light emission section such that the flash light emission section can pivot.

9. The camera according to claim 8, wherein when the flash light emission section is in the storage position, the pivot is arranged such that a distance between the pivot and a horizontal plane formed in front of the pivot increases as the pivot is away from a central portion of the camera main body along the horizontal plane, when viewed from above the camera.

10. The camera according to claim 8, wherein the pivot is provided behind the flash light emission section.

11. The camera according to claim 8, wherein when the flash light emission section is in the storage position, the light emission tube is parallel to the pivot when viewed from a front of the camera, and when the flash light emission section pivots on the pivot and shifts from the storage position to the protruding position, the light emission tube is inclined to the pivot when viewed from the front of the camera.

12. The camera according to claim 8, wherein the pivot and the flash case are arranged such that a distance between a light emission opening formed in the flash case and the pivot differs between different axial positions of the pivot.

13. The camera according to claim 8, wherein the pivot is arranged such that an axis thereof extends along an external line of a camera exterior that forms a front surface and an upper surface of the camera.

14. A flash light emission unit comprising:
    a flash light emission section for emitting flash light, the flash light emission section being displaceable between a first position in which light emission is permitted and a second position in which light emission is inhibited; and a pivot provided nonparallel to a direction of light emitted from the flash light emission section, and also nonparallel to a plane perpendicular to the direction of light emitted from the flash light emission section, the pivot supporting the flash light emission section such that the flash light emission section can pivot between the first and second positions.

15. The flash light emission unit according to claim 14, wherein the flash light emission section includes a flash case, and a light emission tube and a reflector provided in the flash case.

* * * * *